United States Patent
Kim et al.

(10) Patent No.: US 9,518,177 B2
(45) Date of Patent: Dec. 13, 2016

(54) COMPOSITE MATERIAL FOR MEANS OF TRANSPORT INCLUDING POLYPROPYLENE RESIN AND LONG CARBON FIBER

(71) Applicant: KOREA INSTITUTE OF INDUSTRIAL TECHNOLOGY, Cheonan (KR)

(72) Inventors: Dong Hyun Kim, Gunpo (KR); Dae Young Lim, Yongin (KR); Ki Young Kim, Yongin (KR); No Hyung Park, Anyang (KR); Hyo Jin An, Anyang (KR); Jung Soo Kim, Wonju (KR); Eun Soo Lee, Ansan (KR)

(73) Assignee: KOREA INSTITUTE OF INDUSTRIAL TECHNOLOGY, Cheonan-Si (KR)

( * ) Notice: Subject to any disclaimer, the term of this patent is extended or adjusted under 35 U.S.C. 154(b) by 0 days.

(21) Appl. No.: 14/897,254

(22) PCT Filed: Sep. 12, 2013

(86) PCT No.: PCT/KR2013/008249
§ 371 (c)(1),
(2) Date: Dec. 10, 2015

(87) PCT Pub. No.: WO2014/204053
PCT Pub. Date: Dec. 24, 2014

(65) Prior Publication Data
US 2016/0137823 A1    May 19, 2016

(30) Foreign Application Priority Data

Jun. 21, 2013 (KR) .................. 10-2013-0071489

(51) Int. Cl.
*C08L 23/12* (2006.01)
*C08K 7/02* (2006.01)
*C08L 23/10* (2006.01)

(52) U.S. Cl.
CPC .................. *C08L 23/12* (2013.01); *C08K 7/02* (2013.01); *C08L 23/10* (2013.01)

(58) Field of Classification Search
CPC ............. C08L 23/12; C08L 23/10; C08K 7/02
See application file for complete search history.

(56) References Cited

U.S. PATENT DOCUMENTS

| 6,927,249 B1 | 8/2005 | Lee |
| 2007/0087193 A1 | 4/2007 | Lee |

FOREIGN PATENT DOCUMENTS

| JP | 2009-074043 | * | 4/2009 |
| KR | 10-0666769 | | 1/2007 |
| KR | 10-2006-0061077 | * | 7/2008 |
| KR | 10-2008-0061077 | | 7/2008 |
| KR | 10-2010-0051496 | | 5/2010 |
| KR | 10-2012-0106472 | | 9/2012 |

* cited by examiner

*Primary Examiner* — Robert Harlan
(74) *Attorney, Agent, or Firm* — Lex IP Meister, PLLC

(57) ABSTRACT

The present invention relates to a composite material for a transport, including a polypropylene resin and a carbon long fiber, and more particularly, to a fiber reinforced composite material composition for a transport including 40-90 wt % of a polypropylene resin, 5-60 wt % of a carbon long fiber having a fiber diameter of 1-50 μm and a weight average fiber length of 20-150 mm, and 0.3-10 wt % of a compatibilizer. The compatibilizer includes one selected from the group consisting of an ionomer, a copolymer of propylene-polar monomer, a modification water added polymer and combinations thereof. The composite material has improved interface properties between the polypropylene resin and the carbon long fiber owing to a specific compatibilizer, improved rigidity, impact resistance and heat resistance, and may be applied to various fields requiring the fiber reinforced composite material as well as various transports including an automobile.

4 Claims, 2 Drawing Sheets

COMPOSITE MATERIAL FOR MEANS OF TRANSPORT INCLUDING POLYPROPYLENE RESIN AND LONG CARBON FIBER

TECHNICAL FIELD

The present invention relates to a composite material composition including a polypropylene resin and a carbon long fiber, having improved physical properties and applicable for various transports.

BACKGROUND ART

A composite material is a material in which at least two materials having different components or shapes as a reinforcement and a matrix are combined macroscopically so as to have a distinctive interface and effective functions. The composite material may secure various physical properties through efficient combination of each component and may be applied to various fields including aviation, space, automobiles, sports, industrial machines, medical instruments, logistics supplies, construction, and engineering materials.

A fiber reinforced composite material is manufactured using a fiber such as a glass fiber, a carbon fiber, an aramide fiber, and a silicon carbide fiber as a reinforcement, and receives much attention among composite materials, because of merits including high strength, lightweight and good moldability. Particularly, the fiber reinforced composite material is used in various uses by changing the quality of the reinforcement, the length of a fiber, etc.

Among the fibers, the glass fiber is the most widely used one as the reinforcement. For example, Korean Laid-open Patent Publication No. 2006-7004105 discloses the application of a blend of a polypropylene copolymer and a glass fiber to car articles such as a car seat, a headrest, a knee protection device, a globe box door, an instrument panel, a bumper facia, and a bumper beam, and Japanese Laid-open Patent Publication No. 2008-202013 mentions the application of a polycarbonate/styrene resin and a glass long fiber to the exterior panel of a car.

As the reinforcement other than the glass fiber, Japanese Laid-open Patent Publication No. 2011-137077 discloses a fiber reinforced composite material in which a polypropylene resin includes an organic long fiber such as a polyester fiber or a polyamide fiber so as to be used in an instrument panel of a car. Korean Laid-open Patent Publication No. 2006-0075902 discloses a fiber reinforced composite material obtained by adding a glass fiber, a carbon fiber, a graphite fiber or a metal fiber to a propylene resin with low brittleness.

A carbon fiber reinforced composite material using a carbon fiber as the reinforcement among the fiber reinforced composite material, is light and has better physical properties such as rigidity, impact resistance, heat resistance, chemical stability, dimensional stability, corrosion resistance, and flexibility than other reinforcements. The physical properties may be improved further by using a long fiber which has a long carbon fiber.

Generally, a fiber reinforced composite material may be manufactured by blending a thermoplastic resin used as a matrix with a fiber reinforcement, melting and molding by extrusion molding, etc. During molding, fibers may infiltrate between microstructures of the resin and be uniformly dispersed in the matrix as a reinforcement. In the case where a long fiber is used as the reinforcement, miscibility with the resin may be low, and the infiltration of the resin into the microstructures may not be easy, thereby rather deteriorating physical properties.

In order to stabilize interface properties between a matrix resin and a fiber for a reinforcement, various methods are known, and one of the methods uses a compatibilizer during molding. As the compatibilizer, modified polyolefine (PO) (PP-g-MA) prepared by grafting a polypropylene resin and anhydrous maleic acid (MAH) in a ratio of 9:1 is the most widely used. The compatibilizer is used irrespective of the material of the reinforcement or the matrix.

For the fiber reinforced composite material, the kind or amount of a resin used as a matrix may be changed according to the application, and accordingly, the selection of a reinforcement among a glass fiber, a carbon fiber, an aramide fiber, a metal fiber, etc. may be changed. That is, interface properties between the resin and the reinforcement may be different according to the kind of the matrix resin and the reinforcement, and sufficient physical properties may not be secured by simply applying PP-g-MA known as the compatibilizer. Further, the interface properties may be greatly influenced by the parameters of a molding process.

Therefore, an optimized compatibilizer is required to be selected according to the kind of a matrix resin and a reinforcement to secure sufficient physical properties irrespective of a molding process.

DISCLOSURE OF THE INVENTION

Technical Problem

After putting forth a multilateral effort into selecting a polypropylene resin as a matrix resin and a carbon long fiber as a reinforcement and selecting a compatibilizer capable of improving interface properties, the inventors of the present application found that the physical properties of a fiber reinforced composite material finally obtained by using a certain amount of a specific compatibilizer may be improved, and the interface properties between the polypropylene resin and the carbon long fiber may be improved, and completed the present invention.

Another aspect of the present invention provides a fiber reinforced composite material composition having improved physical properties such as rigidity, impact resistance and heat resistance, by reinforcing a polypropylene resin with a carbon long fiber.

Technical Solution

According to at least one of embodiments, a fiber reinforced composite material composition for a transport includes 40-90 wt % of a polypropylene resin, 5-60 wt % of a carbon long fiber having a fiber diameter of 1-50 μm and a weight average fiber length of 20-150 mm, and 0.3-15 wt % of a compatibilizer, wherein the compatibilizer includes one selected from the group consisting of an ionomer, a copolymer of propylene-polar monomer, a modification water added polymer and combinations thereof.

Advantageous Affects

The fiber reinforced composite material suggested in the present invention has improved rigidity, impact resistance and heat resistance when compared to a common glass fiber or a carbon short fiber, and may be applied to various transports including an automobile and in various fields requiring a composite material.

BEST MODE FOR CARRYING OUT THE INVENTION

Figure 1:
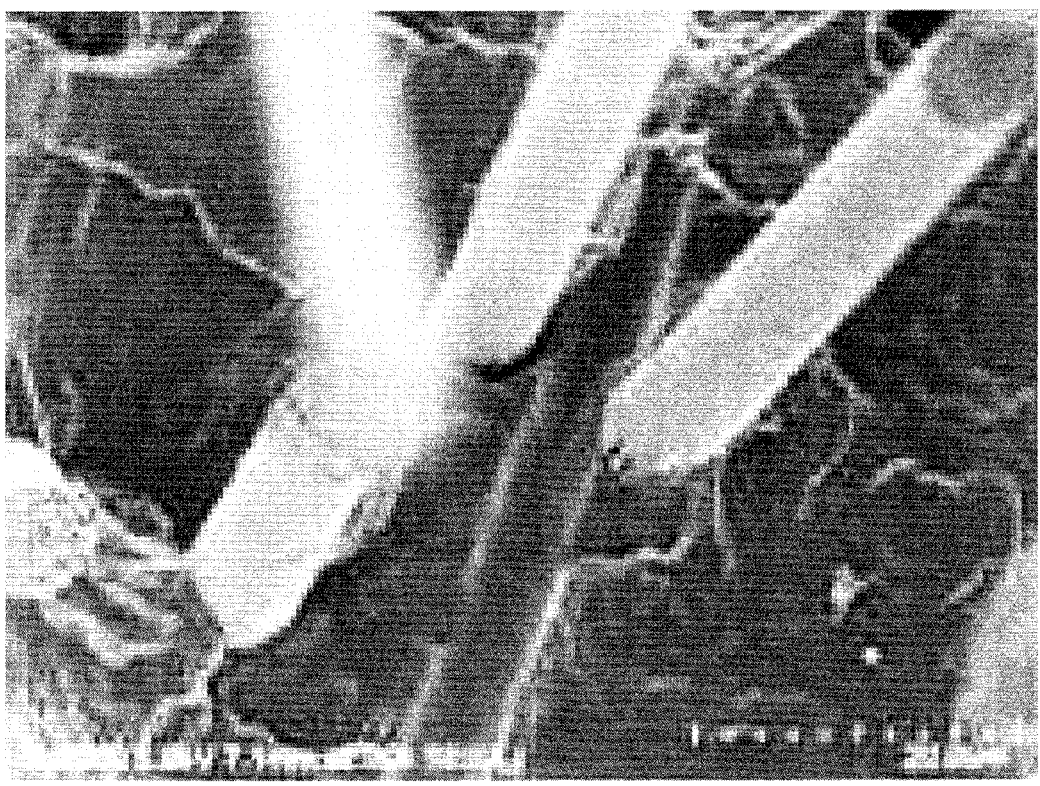
FIG. 1 is a photographic image of a scanning electron microscope for showing a fracture surface of a composite material manufactured in Example 1.

In the present invention, an appropriate compatibilizer is suggested to increase miscibility of a polypropylene resin with a carbon long fiber. Owing to the use of the compatibilizer, a thermoplastic resin and a carbon long fiber may be appropriately blended in a molding process, and interface properties between them may be improved after molding, thereby sufficiently securing physical properties through the reinforcement of the carbon long fiber.

Particularly, the fiber reinforced composite material suggested in the present invention includes 40-90 wt % of a polypropylene resin, 5-60 wt % of a carbon long fiber having a fiber diameter of 1-50 μm and a weight average fiber length of 20-150 mm, and 0.3-15 wt % of a compatibilizer.

The polypropylene resin is not specifically limited in the present invention and may include a single polymer or a copolymer of polypropylene and all structures such as an isotactic structure, a syndiotactic structure and an atactic structure.

Particularly, the polypropylene copolymer means a copolymer obtained by copolymerizing a propylene monomer and an alpha olefin monomer. The alpha olefin may include one selected from the group consisting of 1-butene, 1-pentene, 1-hexene, 4-methyl-1-pentene, 1-heptene, 1-octene, 1-nonene, 1-decene, 1-undecene, 1-dodecene and combinations thereof. The polypropylene copolymer may include a propylene-ethylene copolymer, a propylene-ethylene-alpha olefin copolymer, etc.

The polypropylene copolymer may be a random copolymer, a block copolymer or a graft copolymer, and may be selected appropriately according to the purpose of use.

In the present invention, the polypropylene resin may be used in an amount ratio of 40-90 wt % relative to 100 wt % of the total composite material composition. In the case where the amount of the polypropylene resin is less than the lower limit, the composite material may not function as a matrix, and in the case where the amount is greater than the upper limit, the relative amounts of the carbon long fiber or the compatibilizer may decrease, and desired physical properties may not be obtained. Therefore, an appropriate amount of the polypropylene resin may be used within the amount range.

The carbon long fiber used as the reinforcing fiber may influence expected effects as a reinforcing fiber according to the diameter, average weight fiber length, and amount used thereof. As described above, the carbon long fiber is required to infiltrate the microstructures of a molten polypropylene resin and be uniformly dispersed. In this case, good mechanical properties and thermal properties may be attained with a diameter and average weight fiber length within appropriate ranges.

Preferably, a carbon long fiber having a fiber diameter of 1-50 μm and a weight average fiber length of 20-150 mm may be used in an amount ratio of 5-60 wt % relative to 100 wt % of a total composition.

In the case where the diameter of the carbon long fiber is less than the lower limit, carbon long fiber may be too thin to be used as a reinforcing fiber, and a sufficient reinforcing effect of physical properties may not be obtained, and entangling of fibers may be generated. On the contrary, in the case where the amount is greater than the upper limit, the carbon long fiber may not sufficiently infiltrate into a molten polypropylene resin, and desired physical properties may not be sufficiently obtained. Therefore, an appropriate amount of the carbon long fiber may be used within the amount range.

In addition, in the case where the weight average fiber length of the carbon long fiber is less than the lower limit, the fiber is not a long fiber anymore but a short fiber, and physical properties (that is, rigidity, impact resistance, heat resistance, etc.) desired to be attained by using the long fiber may not be sufficiently obtained. On the contrary, in the case where the fiber length is greater than the upper limit, entangling may be generated during molding due to an excessively large length, or interface properties at the microstructure of the polypropylene resin may be deteriorated, and sufficient physical properties may not be secured. Therefore, an appropriate amount of the carbon long fiber may be used within the amount range.

The carbon long fiber suggested in the present invention may be used within the amount range in order to secure sufficient physical properties as a reinforcing material. In the case where the amount is less than the lower limit, sufficient physical properties may not be secured even though using the carbon long fiber. On the contrary, in the case where the amount is greater than the upper limit, the manufacture of the composite resin may be difficult, and the carbon long fiber may entangle during molding and be non-uniformly dispersed in a polypropylene resin matrix, thereby possibly inducing the deterioration of the physical properties of the composite material. Therefore, an appropriate amount of the carbon long fiber may be used within the amount range.

Particularly, a specific compatibilizer may be used in a certain amount ratio for the miscibility of the polypropylene resin with the carbon long fiber in the present invention.

Preferably, the compatibilizer may be one selected from the group consisting of an ionomer, a copolymer of propylene-polar monomer, a modification water added polymer and combinations thereof, and may be used in an amount ratio of 0.3-15 wt % in 100 wt % of the total composition.

The compatibilizer may improve interface properties between the propylene resin and the carbon long fiber via a chemical bond or a physical bond.

For the compatibilizer, the control of the amount as well as the kind thereof in the total composition is also significant. An appropriate amount of the compatibilizer is required to be used to improve the miscibility between the polypropylene resin and the carbon long fiber during molding. In the case where the amount is less than the lower limit, the carbon long fiber may not be uniformly dispersed in a polypropylene resin matrix, and the improving of physical properties owing to the use of the carbon long fiber may not be expected. On the contrary, in the case where the amount is greater than the upper limit, the production costs may undesirably increase due to the use of the compatibilizer. Therefore, an appropriate amount of the compatibilizer may be used within the amount range.

The ionomer in the compatibilizer is a polymer combined with a metal ion at a main chain or a branched chain and may include, without specifically limiting the kinds thereof, an ethylene-methacrylic acid copolymer ionomer, an ethylene-acrylic acid copolymer ionomer, a propylene-methacrylic acid copolymer ionomer, a propylene-acrylic acid copolymer ionomer, a butylene-acrylic acid copolymer ionomer, an ethylene-vinyl sulfonic acid copolymer ionomer, a styrene-methacrylic acid copolymer ionomer-a sulfonated polystyrene ionomer, a fluorinated ionomer, a telechelic polybutadieneacrylic acid ionomer, a sulfonated ethylene-propylene-diene copolymer ionomer, a hydrogenated polypentamer ionomer, a polypentamer ionomer, a poly(vinylpyridinium salt) ionomer-a poly(vinyltrimethylammonium salt) ionomer, a poly(vinylbenzylphosphonium salt) ionomer, a styrene-butadiene acrylic acid copolymer ionomer, a polyurethane ionomer-a sulfonated styrene-2-acrylamide-2-methylpropanesulfate ionomer, an acid-amine ionomer, an aliphatic ionene, an aromatic ionene, etc. The ionomer may be used alone or as a mixture of two or more as occasion demands. Among the ionomers, the propylene-methacrylic acid copolymer ionomer and the propylene-acrylic acid copolymer ionomer may be preferable, and the anion of the ionomer may include a halogenide ion, particularly, $Cl^-$, $Br^-$, $I^-$, etc.

In this case, the metal ion may include an alkali metal ion such as $Li^+$, $Na^+$ and $K^+$, an alkaline rare earth metal ion such as $Mg^{2+}$, $Ca^{2+}$, $Sr^{2+}$ and $Ba^{2+}$, and a transition metal ion such as $Zn^{2+}$, $Cu^{2+}$, $Mn^{2+}$, $Ni^{2+}$, $Co^{2+}$, $Co^{3+}$, $Fe^{3+}$ and $Cr^{3+}$.

The copolymer of propylene-polar monomer is a copolymer obtained by copolymerizing a propylene monomer with a monomer including a polar functional group such as an acid anhydride group, an epoxy group, a carboxyl group and a carboxylic acid ester. As the monomer capable of copolymerizing may include an unsaturated carboxylic acid or an anhydride of acrylic acid, methacrylic acid, maleic acid, fumaric acid, or itaconic acid; an unsaturated carboxylic acid ester of methyl acrylate, methyl methacrylate, dimethyl maleate, monomethyl maleate, diethyl fumarate, dimethyl itaconate, diethyl citraconate, or dimethyl tetrahydrophthalate anhydride; an unsaturated monocarboxylic acid glycidyl ester of glycidyl acrylate, glycidyl methacrylate, or p-styrylcarboxylic glycidylate; an unsaturated polycarboxylic acid monoglycidyl ester or polyglycidyl ester of maleic acid, itaconic acid, citraconic acid, or butenetricarboxylic acid; and an unsaturated glycidyl ether of allyl glycidyl ether, 2-methylallyl glycidyl ether, or glycidyl ether of o-allylphenol.

In addition, the modified water added polymer is not specifically limited and may include, for example, a water added styrenebutadiene rubber, styrene-ethylene-butylene-polyethylene block copolymer, polyethylene-ethylene-butylene-polyethylene block copolymer, styrene-ethylene-propylene-styrene block copolymer, etc. modified from an acid anhydride group, an epoxy group, a carboxyl group, a carboxylic acid ester, etc. Among the copolymer, the styrene-ethylene-propylene-styrene block copolymer may be preferable.

Particularly, the copolymer of propylene-polar monomer among the above-described compatibilizer is a reactive compatibilizer, and chemical bonding with a polypropylene resin may be possible owing to a functional group, thereby further improving the interface properties between the resin the carbon long fiber owing to the compatibilizer. In addition, the modification water added polymer is a nonreactive compatibilizer, however may improve the interface properties between the resin and the carbon long fiber owing to physical blending with the polypropylene resin.

Besides, the fiber reinforced composite material according to the present invention may further include an additive used in a molding process of a common thermoplastic resin to confirm desired physical properties or for easy molding according to the purpose. For example, one selected from the group consisting of an antioxidant, a process stabilizer, a light stabilizer, an elastomer, a flame retardant, an inorganic filler, carbon black, a crystal nucleating agent, an ultraviolet absorbent, a dust removing agent, an antimicrobial, an insecticide, a deodorant, a colorant, a softener, an antifriction, a pigment, a dye, a thermal stabilizer, a releasing agent, an antistatic agent, a plasticizer, a lubricant, a foaming agent, a defoaming agent, a preservative, a coupling agent, and a mixture thereof may be used.

The additive may be added during molding the composite material, for example, before or during mulling, or separately after mulling, and may be added by an impregnation process as occasion demands. The additive may be used in an amount ratio of not more than 5 wt % in the total composition, and the selection of the kind and amount of the additive may be controlled by a person skilled in the art.

The manufacture of the fiber reinforced composite material is not specifically limited in the present invention, however various known methods in this field may be used. For example, various methods including extrusion, injection molding, pultrusion molding, compression molding, resin transfer molding (RTM), hand lay-up molding, autoclave molding, and filament winding molding may be used.

For example, the composite material may be manufactured by heating a polypropylene resin at above a melting point, adding a carbon long fiber, mulling for a constant time period and drying. In this case, a compatibilizer may be added to the polypropylene resin, and the carbon long fiber with a roving state may be purchased and injected to an extruder.

Other conditions for mulling are not specifically limited and may be appropriately set so that the melting or mulling of the polypropylene resin may be smoothly conducted. With respect to the temperature, the internal temperature of a cylinder, etc. of a mulling apparatus may preferably be set to from 210° C. to 280° C., and may more preferably be set to from 220° C. to 270° C.

In the case where the mulling apparatus is a continuous extruder such as a twin-screw extruder, the screw rotation number may be a level sufficiently mulling each component, may preferably be from 2 to 300 rpm, and may more preferably be from 5 to 200 rpm.

The fiber reinforced composite material obtained from the mulling may be additionally molded according to each purpose. In this case, the molding process is not specifically limited in the present invention, and known methods may be used. For example, a thermal extruder may be used for molding in the case where the mulling apparatus is an extruder.

The fiber reinforced composite material thus manufactured has a breaking strength of 50 MPa or more, a tensile modulus of 6 GPa or more, a flexural rigidity of 180 MPa or more, an impact resistance strength of 30 $KJ/m^2$ or more, and a thermal decomposition temperature of 400° C. or more, and may be applied to various fields.

For example, the composite material may be applied to a material for a transport such as an automobile, a material for aviation and space, a material for defense parts, a material for electrics and electronics, a material for engineering and construction, a material for biomedical and a material for sports, and may preferably be applied to the automobile.

Particularly, the carbon long fiber reinforced composite material according to the present invention may be applied to a transport. The transport may include an automobile, a train, an airplane, a helicopter, a truck, a motorcycle, a bicycle, a ship, a yacht, etc.

That is, since the carbon long fiber composite material is light, the weight lightening of an automobile, particularly, the exterior (for example, a bonnet) of an automobile may be realized by applying the composite material instead of iron or aluminum currently in use. The composite material has good rigidity, impact resistance and heat resistance, and a common material used in a transport may be wholly or partially replaced therewith. Accordingly, the composite material may dominate the market in advance.

MODE FOR CARRYING OUT THE INVENTION

Examples

Hereinafter, preferred embodiments and experimental embodiments of the present invention will be suggested. However, the following embodiments are only for illustration, and the present invention is not limited thereto.

Examples and Comparative Examples

Manufacturing of Fiber Reinforced Composite Materials

Fiber reinforced composite materials were manufactured using the components in the following Tables 1 to 3. Particularly, a polypropylene resin (manufacturer: Polymirae, MI: 12 g/10 min (230° C.)) and a compatibilizer were added to an extruder, the mixture was sufficiently mulled using a first step extruder, and a carbon long fiber or a carbon short fiber was added to a second step extruder to produce a carbon fiber reinforced polypropylene composite material. In this case, the processing temperature was 250° C., and the screw rate was 100 rpm.

TABLE 1

| | Components (wt %) | Example 1 | Example 2 | Example 3 | Example 4 | Example 5 | Example 6 |
|---|---|---|---|---|---|---|---|
| Thermoplastic resin | PP | 89 | 89 | 89 | 89 | 82 | 75 |
| Carbon fiber | Carbon long fiber (length 20 mm, diameter 50 μm) | 10 | 10 | 10 | — | — | — |
| | Carbon long fiber (length 30 mm, diameter 50 μm) | — | — | — | 10.7 | — | — |
| | Carbon long fiber (length 50 mm, diameter 50 μm) | — | — | — | — | 10 | — |
| | Carbon long fiber (length 100 mm, diameter 50 μm) | — | — | — | — | — | 10 |
| Compatibilizer | Ionomer[1] | 1 | — | — | — | — | — |
| | Propylene-based unsaturated copolymer[2] | — | 1 | — | 0.3 | 8.0 | 15.0 |
| | Modification water added polymer[3] | — | — | 1 | — | — | — |

Notes)
[1]Ionomer: potassium salt of propylene-methacrylic acid copolymer ionomer
[2]Propylene-based unsaturated copolymer: propylene-glycidyl methacrylate copolymer
[3]Modification water added polymer: styrene-ethylene-butylene-styrene block copolymer (SEBS)

TABLE 2

| | Components (wt %) | Comparative Example 1 | Comparative Example 2 | Comparative Example 3 | Comparative Example 4 | Comparative Example 5 |
|---|---|---|---|---|---|---|
| Thermoplastic resin | PP | 90 | 90 | 90 | 90 | 90 |
| Carbon fiber | Carbon long fiber (length 20 mm, diameter 50 μm) | 10 | — | — | — | — |
| | Carbon long fiber (length 50 mm, diameter 50 μm) | — | 10 | — | — | — |
| | Carbon long fiber (length 100 mm, diameter 50 μm) | — | — | 10 | — | — |
| | Carbon long fiber (length 1 mm, diameter 50 μm) | — | — | — | 10 | — |
| | Carbon long fiber (length 2 mm, diameter 50 μm) | — | — | — | — | 10 |

TABLE 3

| | Components (wt %) | Comparative Example 6 | Comparative Example 7 | Comparative Example 8 | Comparative Example 9 |
|---|---|---|---|---|---|
| Thermoplastic resin | PP | 90 | 90 | 89 | 70 |

TABLE 3-continued

| Components (wt %) | | Comparative Example 6 | Comparative Example 7 | Comparative Example 8 | Comparative Example 9 |
|---|---|---|---|---|---|
| Carbon fiber | Carbon long fiber (length 20 mm, diameter 50 μm) | — | — | 10.9 | — |
| | Carbon long fiber (length 100 mm, diameter 50 μm) | — | — | — | 10 |
| | Carbon long fiber (length 5 mm, diameter 50 μm) | 10 | — | — | — |
| | Carbon long fiber (length 5 mm, diameter 70 μm) | — | 10 | — | — |
| Compat-ibilizer | Ionomer[1] | — | — | — | — |
| | Propylene-based unsaturated copolymer[2] | — | — | 0.1 | 20 |
| | Modification water added polymer[3] | — | — | — | — |

Experimental Example 1

Analyzing Microstructure

Figure 2:
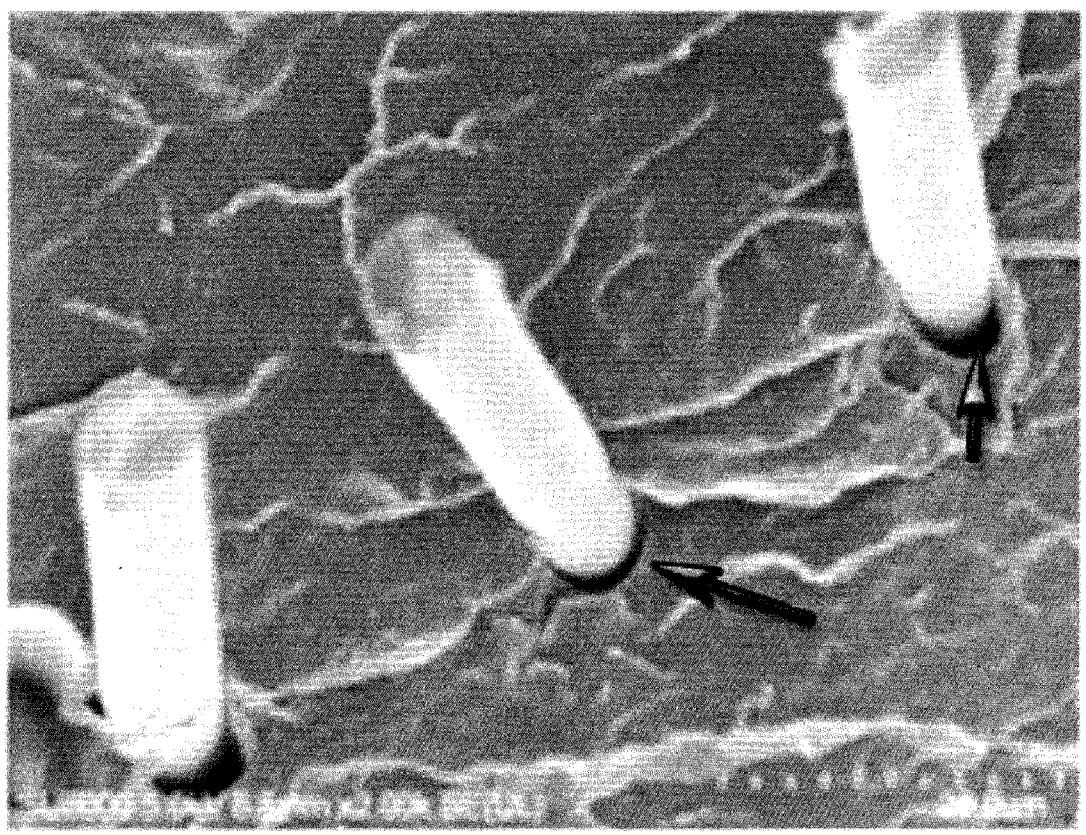
FIG. 2 is a photographic image of a scanning electron microscope for showing a fracture surface of a composite material manufactured in Comparative Example 2.

FIGS. 1 and 2 are photographic images of a scanning electron microscope for showing fracture surfaces of composite material specimens formed using polypropylene and carbon long fibers manufactured in Example 1 and Comparative Example 2, respectively.

Referring to FIG. 1, in the composite material manufactured by the present invention, the polypropylene resin which is a matrix and the carbon long fiber are blended without empty spaces at the interface therebetween. It may be found that a chemical bond is formed between the polypropylene resin and the carbon long fiber owing to a propylene methacrylic acid copolymer which is a compatibilizer, and thus, a composite material having a structure in which the carbon long fiber infiltrated easily between the resins may be produced.

In comparison, referring to the image in FIG. 2 on the composite material not using a compatibilizer, a polypropylene resin and a carbon long fiber are simply blended, and empty spaces are present at the interface therebetween (refer to arrows). The space may play the role of a crack point with respect to external impact, etc. later, and mechanical and thermal properties of the composite material may be deteriorated.

Experimental Example 2

Measuring Physical Properties

The physical properties of the fiber reinforced composite materials manufactured in the examples and comparative examples were measured and the results are shown.

First, evaluation methods of the physical properties of each composition used in the examples and comparative examples will be explained. Items for evaluating applicability to the bonnet of an automobile includes a breaking strength and a tensile modulus for evaluating the rigidity of a molded article for evaluating moldability, a yield elongation rate for evaluating impact absorption, a flexural rigidity test, an impact resistance strength test, and an evaluation of a thermal decomposition temperature. Particular evaluation methods thereof are as follows.

(1) Breaking strength, tensile modulus and yield elongation rate: The breaking strength and the tensile modulus are typical items for evaluating rigidity, and the yield elongation rate is an item for evaluating impact absorption in an elastic region and a baking region. Tests were conducted on the basis of an ASTM D-638 method, a specimen standard was ASTM D-638 $1^{st}$ type, and a crosshead rate was 5 mm/min.

(2) Flexural rigidity: The flexural rigidity is a typical measuring item for evaluating rigidity, and the higher the flexural rigidity, the better the mechanical strength. In this case, the thickness of a finally molded article may be decreased, or the molded article may support the more weight. The flexural rigidity was measured on the basis of an ASTM D-790 method, and the specimen standard thereof was 12.7×127×6.4 mm, and a crosshead rate was 10 mm/min.

(3) Impact resistance strength: The impact resistance strength is a typical item for evaluating the absorption ability of impact. A test was conducted on the basis of an ASTM D-250 method at room temperature (23° C.), and a specimen standard was 63.5×12.7×3 mm.

(4) Thermal decomposition temperature: The thermal decomposition temperature was measured by an ASTM E-474 method using thermogravimetric analysis (TGA). The temperature was measured when the weight change was 10% while uniformly elevating the temperature of TGA by a rate of 120° C./hr.

TABLE 4

| | Breaking strength (MPa) | Tensile modulus (GPa) | Yield elongation rate (%) | Flexural rigidity (MPa) | Impact resistance strength (KJ/m$^2$) | Thermal decomposition temperature (° C.) |
|---|---|---|---|---|---|---|
| Example 1 | 74 | 7.2 | 3.5 | 210 | 40 | 426 |
| Example 2 | 63 | 6.7 | 2.4 | 196 | 35 | 422 |
| Example 3 | 55 | 6.0 | 2.9 | 185 | 32 | 420 |
| Example 4 | 81 | 8.0 | 3.0 | 230 | 45 | 432 |
| Example 5 | 89 | 9.1 | 2.5 | 241 | 51 | 439 |
| Example 6 | 94 | 9.8 | 3.1 | 259 | 59 | 445 |

TABLE 4-continued

|  | Breaking strength (MPa) | Tensile modulus (GPa) | Yield elongation rate (%) | Flexural rigidity (MPa) | Impact resistance strength (KJ/m²) | Thermal decomposition temperature (° C.) |
|---|---|---|---|---|---|---|
| Comparative Example 1 | 45 | 5.0 | 2.0 | 174 | 27 | 403 |
| Comparative Example 2 | 54 | 5.7 | 2.3 | 181 | 28 | 396 |
| Comparative Example 3 | 52 | 5.8 | 2.1 | 171 | 29 | 378 |
| Comparative Example 4 | 28 | 3.3 | 2.3 | 169 | 20 | 402 |
| Comparative Example 5 | 38 | 3.9 | 2.3 | 178 | 23 | 404 |
| Comparative Example 6 | 40 | 4.1 | 2.2 | 182 | 26 | 404 |
| Comparative Example 7 | 45 | 5.4 | 2.0 | 167 | 28 | 382 |
| Comparative Example 8 | 48 | 5.7 | 2.1 | 175 | 28 | 389 |
| Comparative Example 9 | 47 | 5.1 | 1.8 | 184 | 38 | 398 |

Referring to Table 4, the mechanical and physical properties of the composite materials formed using polypropylene and carbon long fibers and using a propylene-methacrylic acid compatibilizer were the best. Particularly, referring to Examples 1 to 3, the physical properties were further improved when using a reactive compatibilizer (Example 2) when compared to a case using a nonreactive compatibilizer (Example 3).

In addition, it would be found that the mechanical and thermal properties of the composite materials formed using the polypropylene and the carbon long fiber were better when the length of the carbon fiber applied was longer. The physical properties of the composite materials of Comparative Examples 1 to 3 were better than those of the composite materials using carbon short fibers according to Comparative Examples 4 to 6, and the physical properties were improved more when using carbon long fibers and the compatibilizer of Examples 1 to 6 as suggested in the present invention. However, in the case where a small amount of the compatibilizer was used (Comparative Example 8) or an excessive amount thereof was used (Comparative Example 9), physical properties may be rather deteriorated, and the improvement of the physical properties may be expected when the amount of the compatibilizer was controlled to an appropriate amount.

The invention claimed is:

1. A fiber reinforced composite material composition for a transport, comprising 40-90 wt % of a polypropylene resin, 5-60 wt % of a carbon long fiber having a fiber diameter of 1-50 μm and a weight average fiber length of 20-150 mm, and 0.3-10 wt % of a compatibilizer,
wherein the compatibilizer is styrene based block copolymer selected from the group consisting of styrene-ethylene-butylene-styrene block copolymer, styrene-ethylene-butylene-ethylene block copolymer, styrene-ethylene-propylene-styrene block copolymer, styrene-ethylene-propylene block copolymer and combinations thereof.

2. The fiber reinforced composite material composition for a transport of claim 1, wherein the polypropylene resin is a polypropylene single polymer or a copolymer of polypropylene and alpha olefin.

3. The fiber reinforced composite material composition for a transport of claim 2, wherein the alpha olefin comprises one selected from the group consisting of 1-butene, 1-pentene, 1-hexene, 4-methyl-1-pentene, 1-heptene, 1-octene, 1-nonene, 1-decene, 1-undecene, 1-dodecene and combinations thereof.

4. The fiber reinforced composite material composition for a transport of claim 1, wherein the fiber reinforced composite material composition for a transport satisfies physical properties as follows: a breaking strength of 50 MPa or more, a tensile modulus of 6 GPa or more, a flexural rigidity of 180 MPa or more, an impact resistance strength of 30 KJ/m² or more, and a thermal decomposition temperature of 400° C. or more.

* * * * *